US012744274B2

(12) United States Patent
Yokoyama et al.

(10) Patent No.: US 12,744,274 B2
(45) Date of Patent: Sep. 22, 2026

(54) BATTERY SUPPORT STRUCTURE

(71) Applicant: SUBARU CORPORATION, Tokyo (JP)

(72) Inventors: Yutaka Yokoyama, Tokyo (JP); Shinichi Kimura, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 757 days.

(21) Appl. No.: 17/823,375

(22) Filed: Aug. 30, 2022

(65) Prior Publication Data

US 2023/0085205 A1 Mar. 16, 2023

(30) Foreign Application Priority Data

Sep. 15, 2021 (JP) ................................ 2021-150273

(51) Int. Cl.

| | |
|---|---|
| ***A61G 5/10*** | (2006.01) |
| ***B60R 16/04*** | (2006.01) |
| ***H01M 50/204*** | (2021.01) |
| ***H01M 50/249*** | (2021.01) |
| ***H01M 50/30*** | (2021.01) |

(52) U.S. Cl.

CPC ........... *H01M 50/249* (2021.01); *B60R 16/04* (2013.01); *H01M 50/204* (2021.01); *H01M 50/30* (2021.01); *H01M 2220/20* (2013.01)

(58) Field of Classification Search

CPC .. H01M 50/249; H01M 50/30; H01M 50/204; B60R 16/04; H04N 7/18; B60L 50/64; B60L 58/26

USPC ................................................ 180/68.5, 118

See application file for complete search history.

(56) References Cited

U.S. PATENT DOCUMENTS

2007/0238015 A1* 10/2007 Kubota ............. H01M 10/6566 429/120

2008/0196957 A1* 8/2008 Koike ................ H01M 10/613 180/68.5

(Continued)

FOREIGN PATENT DOCUMENTS

JP 2012169276 A * 9/2012 ............ H01M 10/64

JP 2013-129391 A 7/2013

(Continued)

*Primary Examiner* — Valentin Neacsu

*Assistant Examiner* — Nabin Kumar Sharma

(74) *Attorney, Agent, or Firm* — Smith, Gambrell & Russell, LLP

(57) ABSTRACT

A battery support structure includes upper and lower battery modules, a support, and a battery pack case. The upper battery module includes an upper battery module body, and an upper battery module fixing member. The upper battery module fixing member extends downward from the upper battery module body and is coupled to the support. The lower battery module includes a lower battery module body, and a lower battery module fixing member. The lower battery module fixing member extends upward from the lower battery module body and is coupled to the support. The upper battery module is fixed to an upper surface of the support. The lower battery module is fixed to a lower surface of the support. The battery pack case covers the upper and lower battery modules. The battery pack case is fixed to the support on outside of the upper and lower battery modules.

20 Claims, 9 Drawing Sheets

(56) References Cited

U.S. PATENT DOCUMENTS

| | | | | |
|---|---|---|---|---|
| 2012/0175177 | A1* | 7/2012 | Lee | B60K 1/04<br>180/68.5 |
| 2012/0247848 | A1* | 10/2012 | Kosaka | B60L 58/26<br>180/68.1 |
| 2013/0229030 | A1* | 9/2013 | Yamaguchi | B62D 25/20<br>296/193.07 |
| 2014/0234690 | A1* | 8/2014 | Lee | H01M 50/26<br>429/151 |
| 2018/0194212 | A1* | 7/2018 | Hamilton | B60N 2/015 |
| 2018/0269545 | A1* | 9/2018 | Liu | H01M 50/204 |
| 2018/0337433 | A1* | 11/2018 | Champagne | B60L 3/0046 |

FOREIGN PATENT DOCUMENTS

| | | | | |
|---|---|---|---|---|
| JP | 2014-99257 | A | 5/2014 | |
| JP | 2021082424 | A * | 5/2021 | B60K 1/04 |

* cited by examiner

BATTERY SUPPORT STRUCTURE

CROSS-REFERENCE TO RELATED APPLICATIONS

The present application claims priority from Japanese Patent Application No. 2021-150273 filed on Sep. 15, 2021, the entire contents of which are hereby incorporated by reference.

BACKGROUND

The disclosure relates to a battery support structure.

Existing vehicles, such as hybrid vehicles and electric vehicles, use motors to drive vehicle bodies. The motor is rotated by power supplied from an on-board battery. In recent years, in order to extend a continuous travel distance provided by a motor, a large-size battery is mounted on a vehicle body.

Japanese Unexamined Patent Application Publication (JP-A) No. 2014-99257 discloses a support structure for containing a plurality of battery modules in a stacked manner inside a module. Specifically, the support structure disclosed in JP-A No. 2014-99257 includes a base frame to be attached to a vehicle and also includes a middle frame that is stacked on the base frame. In addition, paired right and left side walls are provided so as to form stacking parts for stacking, at side wall parts. In this structure, a first mounting space is provided between the base frame and the middle frame, and second and more mounting spaces are provided on the middle frame. This enables the base frame and the middle frame to contain a plurality of batteries in a stacked manner, resulting in assembling many batteries in a module.

SUMMARY

An aspect of the disclosure provides a battery support structure configured to support a battery module to be provided in a vehicle. The battery support structure includes an upper battery module and a lower battery module as the battery module, a support, and a battery pack case. The upper battery module includes an upper battery module body, and an upper battery module fixing member. The upper battery module fixing member extends downward from the upper battery module body. The upper battery module fixing member is coupled to the support. The lower battery module includes a lower battery module body, and a lower battery module fixing member. The lower battery module fixing member extends upward from the lower battery module body. The lower battery module fixing member is coupled to the support. The upper battery module is fixed to an upper surface of the support. The lower battery module is fixed to a lower surface of the support. The battery pack case covers the upper battery module and the lower battery module. The battery pack case is fixed to the support on an outside of the upper battery module and an outside of the lower battery module.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to describe the principles of the disclosure.

DETAILED DESCRIPTION

There is room for improvement in the technique disclosed in JP-A No. 2014-99257, from the point of view of thermal insulation and other characteristics of a built-in battery.

For example, the base frame and the middle frame of the above-described structure are made of metal plates. Thus, when being mounted to a vehicle body, this structure undesirably conducts heat to the batteries via the base frame and the middle frame. As a result, the batteries are overheated, causing a reduction in charge/discharge efficiency of the batteries. In addition, the base frame or the middle frame is used for each battery, which makes the whole support structure complicated.

It is desirable to provide a battery support structure being excellent in characteristics such as thermal insulation.

Hereinafter, a battery support structure 10 according to an embodiment of the disclosure will be described in detail based on the drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. The following description uses a front-rear direction, an upper-lower direction, and a right-left direction, where the right-left direction is a direction of a vehicle 11 as viewed from a rear side.

Figure 1:
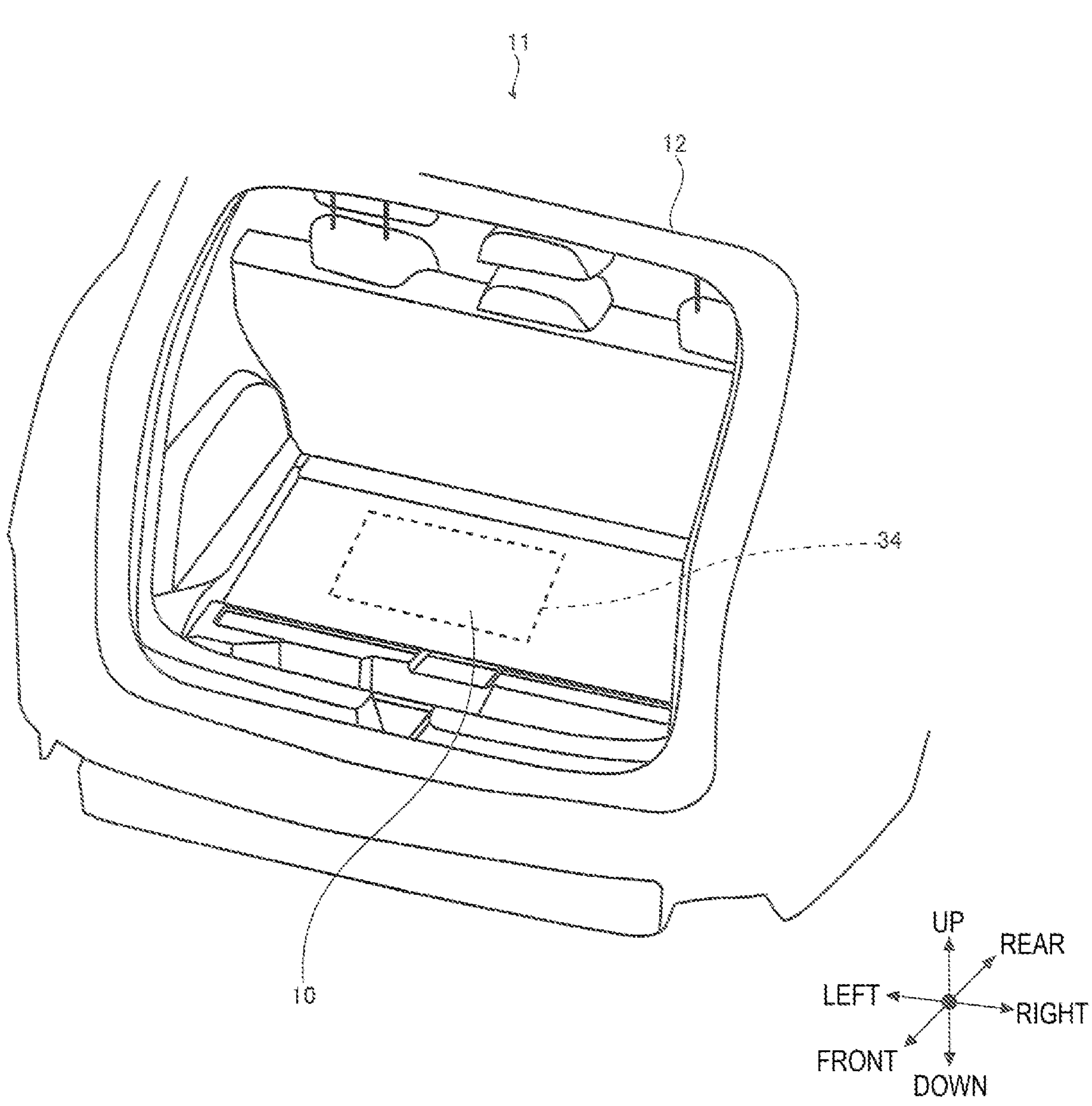
FIG. 1 is a perspective view illustrating the rear of a vehicle having a battery support structure according to an embodiment of the disclosure.

FIG. 1 is a perspective view illustrating the rear of the vehicle 11 having the battery support structure 10. The vehicle 11 is, for example, an automobile or a train, and is mounted with a battery module 13 (refer to FIG. 5 and other drawings) for supplying power to a motor, electric components, etc. The vehicle 11 rotates a motor (not illustrated) by using power supplied from the on-board battery module 13, and thus, the vehicle 11 travels in response to the driving force of the motor. For example, the vehicle 11 is an electrical vehicle (EV), a hybrid electrical vehicle (HEV), a plug-in hybrid electrical vehicle (PHEV), or the like.

The battery support structure 10 is placed, for example, in a housing space 34 under a rear floor on a rear side of the vehicle 11. The battery support structure 10 is placed in such a manner that the longitudinal direction of the battery support structure 10 agrees with the right-left direction of the vehicle 11. Herein, the placement position of the battery support structure 10 is not limited to the housing space 34 under the rear floor and may be a housing space such as under a front floor on which a driver's seat and a passenger seat of the vehicle 11 are placed.

Figure 2:
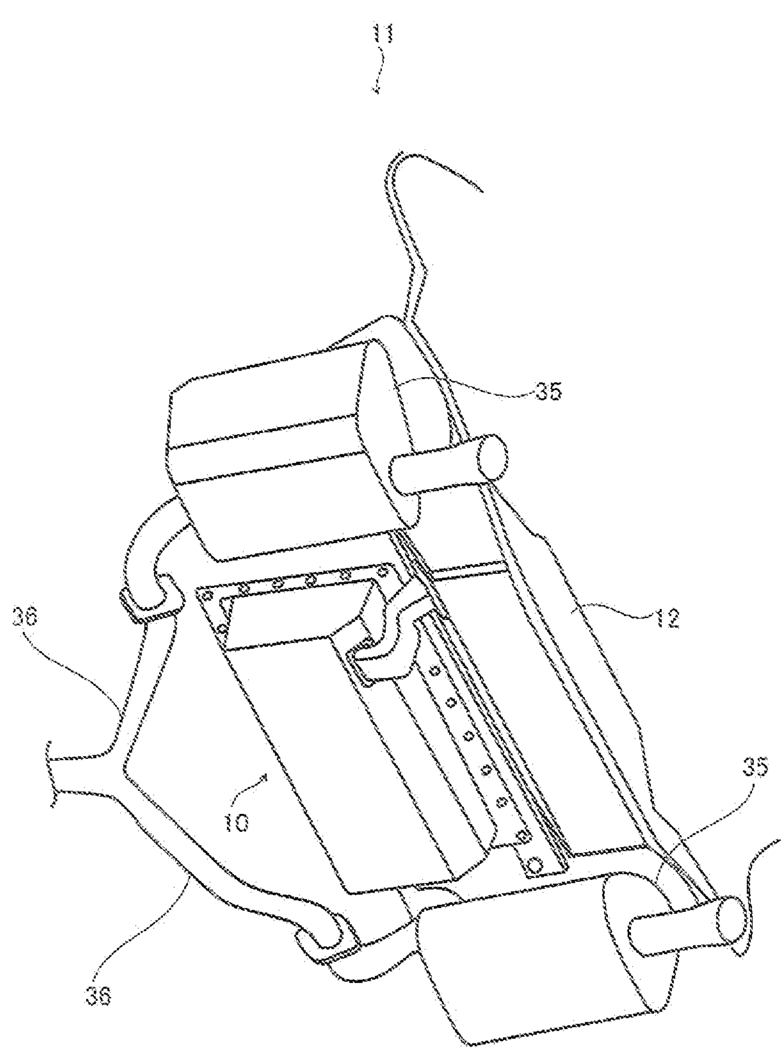
FIG. 2 is a perspective view illustrating a lower surface of the rear of the vehicle having the battery support structure according to the embodiment of the disclosure.
Figure 2:
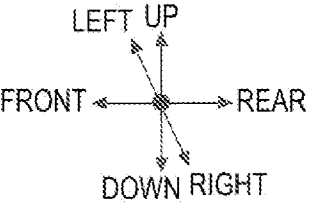

FIG. 2 is a perspective view illustrating a lower surface of the rear of the vehicle 11 having the battery support structure 10.

The battery support structure 10 is disposed on the lower surface of a vehicle body 12, at approximately the center in the right-left direction in the vicinity of a rear end. The battery support structure 10 is interposed between muffler cases 35. A muffler pipe 36 extends forward from the muffler case 35. The muffler pipes 36 are joined together in the middle of extending forward from respective muffler cases 35. The battery support structure 10, which is interposed closely between the muffler cases 35, may be possibly increased in temperature by receiving heat from the muffler cases 35. However, in this embodiment, internal thermal insulation of the battery support structure 10 is improved so as to prevent an unintentional temperature rise of the battery module 13, which will be described later.

Figure 3:
FIG. 3 is an exploded perspective view illustrating a structure of assembling the battery support structure and so on according to the embodiment of the disclosure in a vehicle body.
Figure 3:
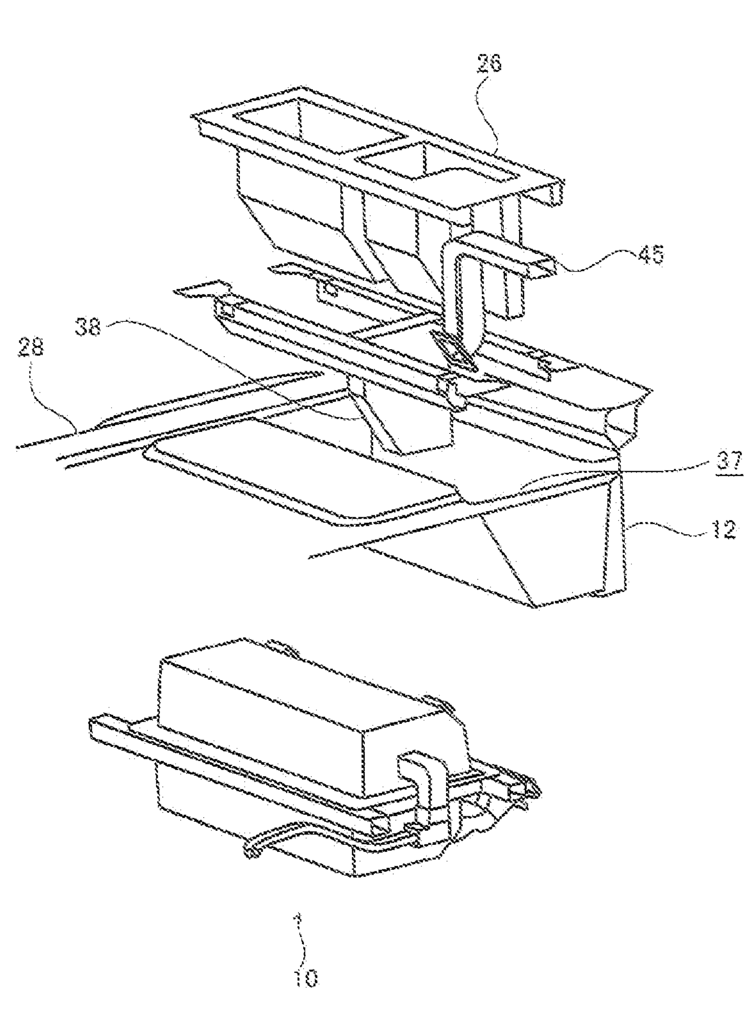
Figure 3:
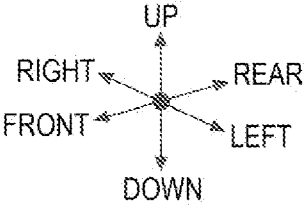

FIG. 3 is an exploded perspective view illustrating a structure of assembling the battery support structure 10 and so on in the vehicle body 12.

A sub-trunk placement area 37 is formed by recessing the floor 28 of a rear end part of the vehicle body 12. The sub-trunk placement area 37 contains a sub-trunk 26. The sub-trunk 26 is a container member with an open upper surface and is made of synthetic resin or the like. In addition, a collision-resistant frame 38 is inserted at a slit-shaped part that is provided at the center in the right-left direction of the sub-trunk 26. The collision-resistant frame 38 will be described later with reference to FIG. 9B. A vehicle interior duct 45 through which air is introduced into the battery support structure 10 is also disposed in the vicinity of the sub-trunk 26.

Figure 4:
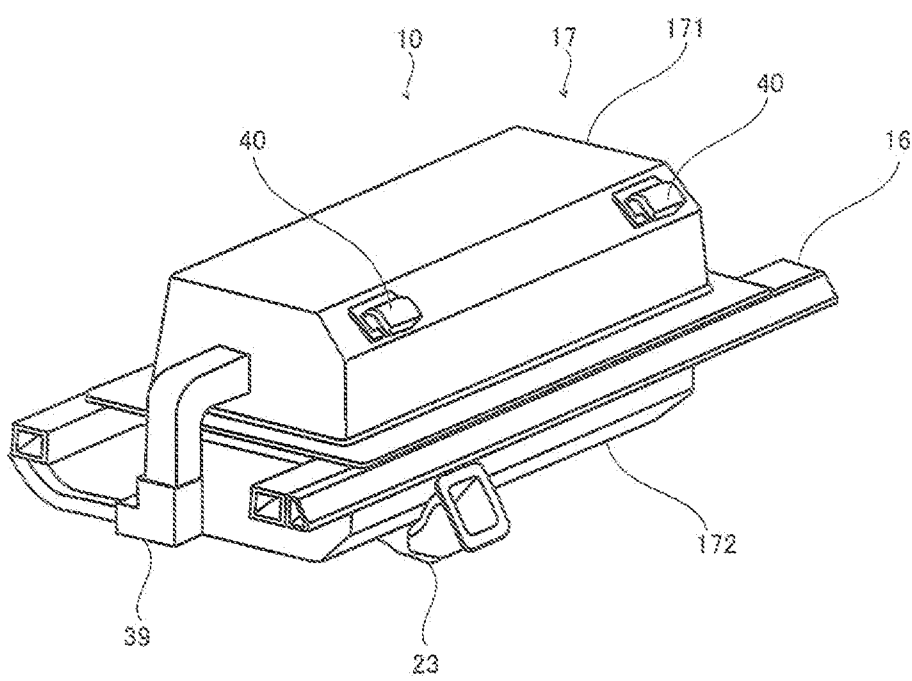
FIG. 4 is a perspective view illustrating the battery support structure and so on according to the embodiment of the disclosure.
Figure 4:
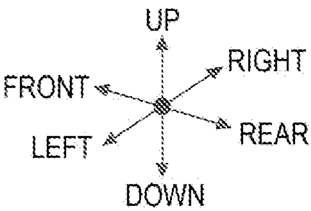
Figure 5:
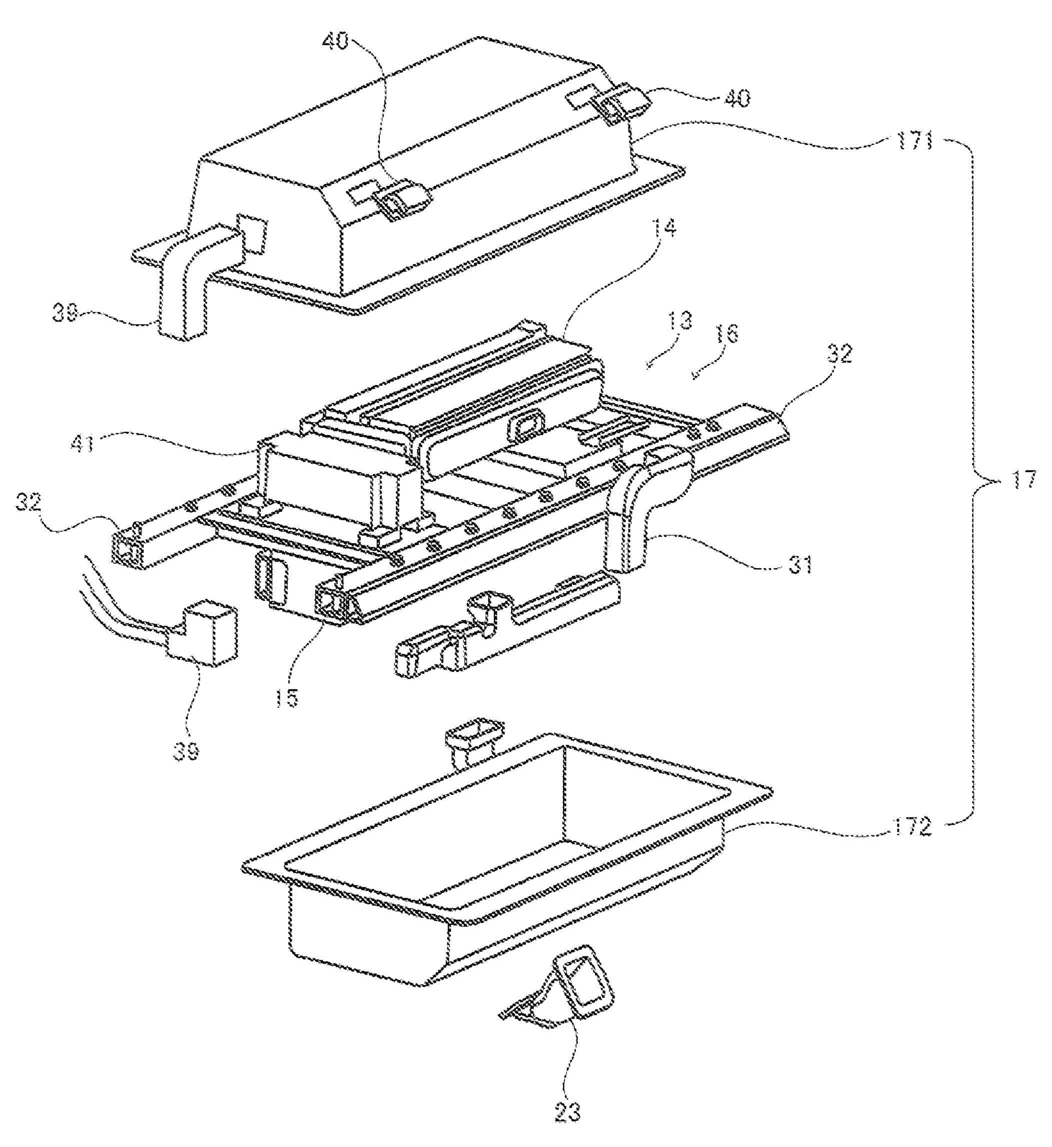
FIG. 5 is an exploded perspective view illustrating the battery support structure and so on according to the embodiment of the disclosure.
Figure 5:
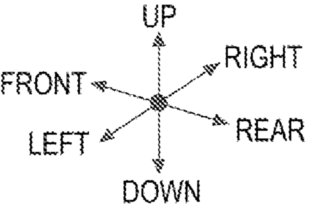

FIG. 4 is a perspective view illustrating the battery support structure 10 and so on. FIG. 5 is an exploded perspective view illustrating the battery support structure 10 and so on.

With reference to FIGS. 4 and 5, the battery support structure 10 is a structure that supports the battery module 13 provided in the vehicle 11. The battery support structure 10 also includes a set of an upper battery module 14 and a lower battery module 15 as the battery module 13, a support 16, and a battery pack case 17, as illustrated in FIG. 5. The upper battery module 14 is fixed to an upper surface of the support 16, whereas the lower battery module 15 is fixed to a lower surface of the support 16.

A power controller 41 is a junction box, and it is disposed on a left side of the upper battery module 14, on the upper surface of the support 16.

The battery pack case 17 is an approximately box-shaped member for protecting the battery module 13 and is formed of a plate-shaped resin, a plate-shaped metal, or the like. The battery pack case 17 includes an upper battery pack case 171 and a lower battery pack case 172. The upper battery pack case 171 is an approximately box-shaped part with an open lower surface, and it constitutes an upper part of the battery pack case 17 and encloses the upper battery module 14 and the power controller 41. The lower battery pack case 172 is an approximately box-shaped part with an open upper surface, and it constitutes a lower part of the battery pack case 17 and encloses the lower battery module 15. The upper battery pack case 171 includes a flange at the lower surface, and the lower battery pack case 172 includes a flange at the upper surface. These flanges are joined together outside the battery module 13. Herein, the upper battery pack case 171 may also be called a "cover", and the lower battery pack case 172 may also be called a "lower case".

A discharge duct 40 is a short duct part and is fitted to an opening that is provided in an upper part of a rear surface of the upper battery pack case 171. The discharge duct 40 is disposed at a left side end part and a right side end part of the upper battery pack case 171. In addition, a wiring protector 39 is a protector for routing a harness.

An introduction duct 23 allows air to pass therethrough into the inside of the battery pack case 17. Details of the introduction duct 23 will be described later with reference to FIG. 8. Herein, an inner duct 31 contained in the battery pack case 17 is also illustrated. Air that is introduced into the battery pack case 17 via the introduction duct 23 passes through the inner duct 31 before being introduced and exchanging heat with the upper battery module 14 and the lower battery module 15. The air after heat exchange is released to the outside via the discharge duct 40.

Figure 6:
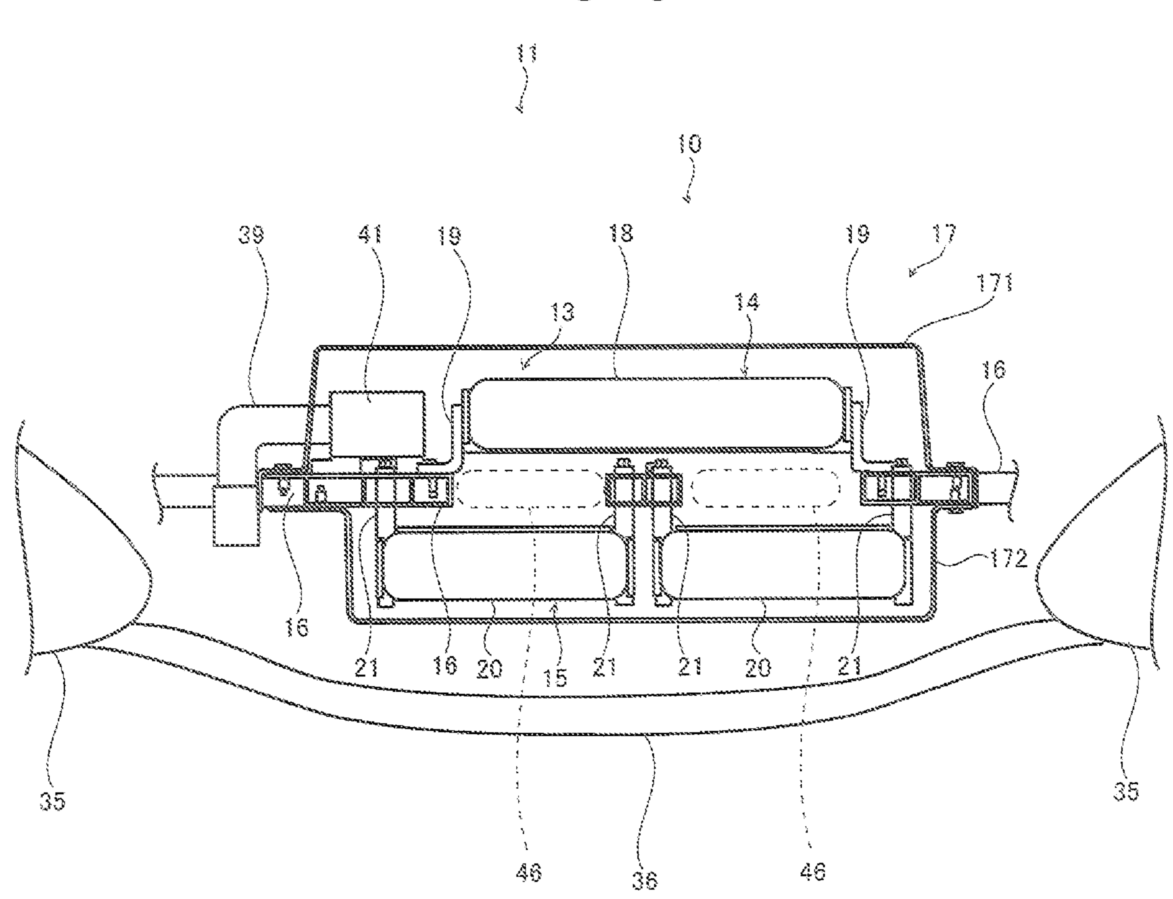
FIG. 6 is a sectional view illustrating a structure of the vehicle at and in the vicinity of the battery support structure and so on according to the embodiment of the disclosure.
Figure 6:
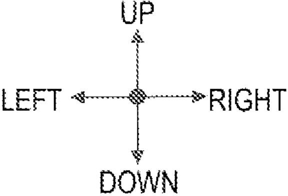

FIG. 6 is a sectional view illustrating a structure of the vehicle 11 at and in the vicinity of the battery support structure 10 and so on. Herein, the support 16 of the battery support structure 10 is disposed in the vicinity of the muffler cases 35 and the muffler pipes 36.

The upper battery module 14 includes an upper battery module body 18 and upper battery module fixing members 19 that extend downward from the upper battery module body 18 to be coupled to the support 16.

The upper battery module body 18 contains a plurality of battery cells. The battery cell can be a secondary battery, such as a nickel hydrogen battery or a lithium ion battery.

The upper battery module fixing member 19 couples a lower end part in the right-left direction of the upper battery module body 18 and the upper surface of the support 16. The upper battery module fixing member 19 can employ, for example, a metal piece that is bent into an approximately L shape. An upper part of the upper battery module fixing member 19 is joined to the upper battery module body 18 by a fastening tool or the like, whereas a lower part thereof is joined to the upper surface of the support 16 by a fastening tool or the like. The lower surface of the upper battery module body 18 is joined to the support 16 at substantially a point via the upper battery module fixing member 19 without coming into contact with the upper surface of the support 16. Thus, in a situation in which the vehicle 11 travels, heat may be conducted from the high-temperature muffler case 35 and so on to the support 16, but the upper battery module body 18, which is in substantially point contact with the support 16, is prevented from rising in temperature because heat conduction from the support 16 to the upper battery module body 18 is reduced.

The lower battery module 15 includes lower battery module bodies 20 and lower battery module fixing members 21 that extend upward from the lower battery module bodies 20 to be coupled to the support 16.

The structure of the lower battery module body 20 is the same as that of the upper battery module body 18.

The lower battery module fixing member 21 couples an upper end part in the right-left direction of the lower battery module body 20 and the lower surface of the support 16. The lower battery module fixing member 21 can employ, for example, a metal member with an approximately pillar shape. An upper part of the lower battery module fixing member 21 is joined to the lower surface of the support 16 by a fastening tool or the like, whereas a lower part thereof is joined to the upper part of the lower battery module body 20 by a fastening tool or the like. The upper surface of the lower battery module body 20 is joined to the support 16 at substantially a point via the lower battery module fixing member 21 without coming into contact with the lower surface of the support 16. This structure reduces heat conduction from the support 16 to the lower battery module body 20, resulting in preventing a temperature rise of the lower battery module body 20.

The battery pack case 17 covers the upper battery module 14 and the lower battery module 15. The battery pack case 17 is also fixed to the support 16 on the outside, that is, on the front side, the rear side, the right side, and the left side, of the upper battery module 14 and the lower battery module 15, to cover them. Meanwhile, the battery pack case 17 does not come into contact with the upper battery module body 18 and the lower battery module body 20. Thus, an air layer is provided between each of the upper battery module body 18 and the lower battery module body 20 and the battery pack case 17, and the air layer functions as a thermal insulation layer. With this structure, although the muffler case 35 and the muffler pipe 36, which can become very high temperature during traveling of the vehicle 11, are disposed in the vicinity of the battery pack case 17, heat conduction from the muffler case 35 and the muffler pipe 36 to the upper battery module body 18 and the lower battery module body 20 is reduced. Moreover, the lower surface of the lower battery module body 20 is separated from the lower surface of the lower battery pack case 172. This structure reduces conduction to the lower battery module body 20 of an impact that is generated when the vehicle 11 rides over a curbstone.

The simple structure of the battery pack case 17 makes it possible to decrease production cost of not only the battery support structure 10 but also the vehicle 11. The battery pack case 17 forms one housing shape as a whole, and therefore, the structure itself provides a water-proof measure and prevents water from reaching the upper battery module body 18 and the lower battery module body 20.

The support 16 has openings 46, and the upper battery module body 18 and the lower battery module body 20 are fixed to the support 16 across the openings 46. With this structure, the upper battery module body 18 and the upper battery module fixing member 19 do not easily receive heat via the support 16.

Herein, an under cover (not illustrated herein) may be added under the lower battery pack case 172. This structure further prevents thrusting up from below and enhances heat-blocking effect.

Figure 7A:
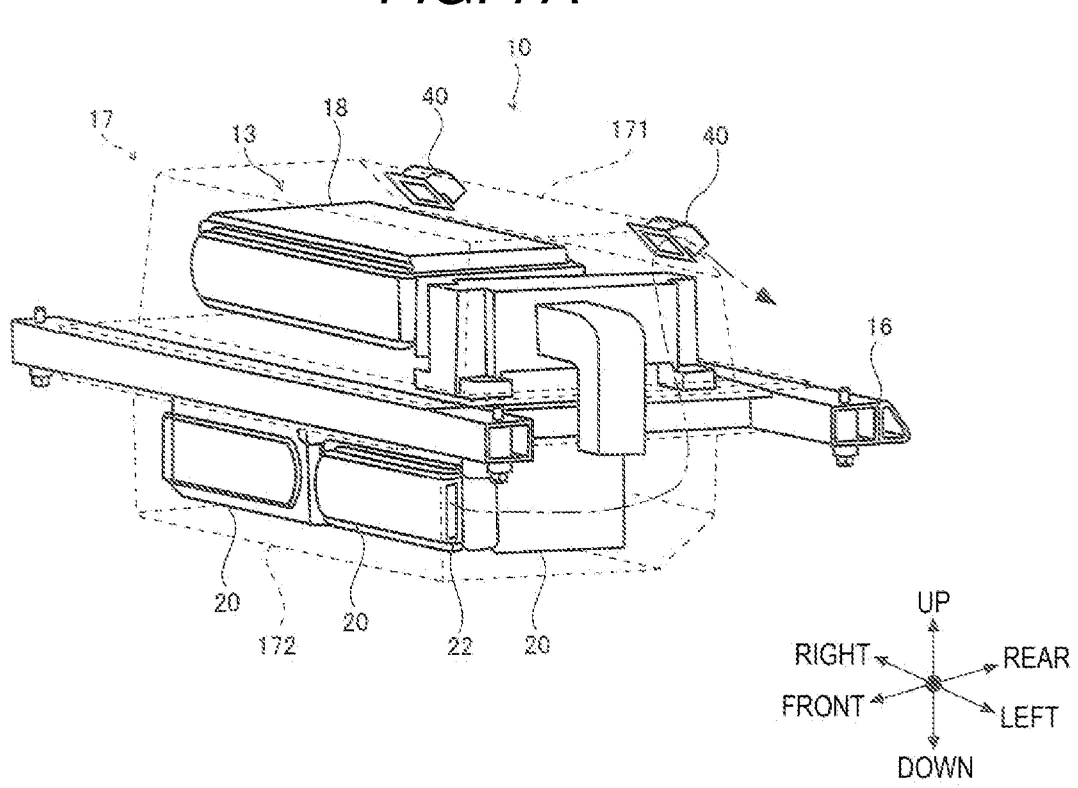
FIG. 7A is a perspective view illustrating the battery support structure and so on according to the embodiment of the disclosure.
Figure 7B:
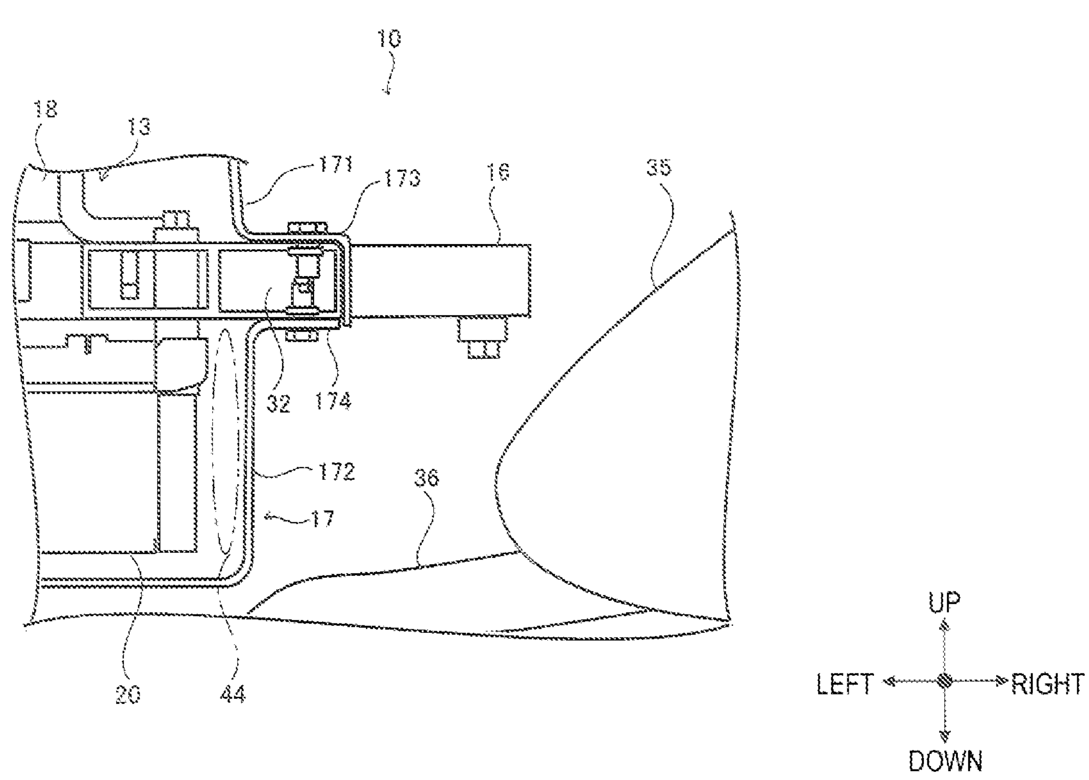
FIG. 7B is a sectional view illustrating a structure of the vehicle at and in the vicinity of the battery support structure and so on according to the embodiment of the disclosure.

FIG. 7A is a perspective view illustrating the battery support structure 10 and so on. The drawing illustrates an air flow inside the battery pack case 17 by an alternate long and short dash line. FIG. 7B is a sectional view illustrating a structure of the vehicle 11 at and in the vicinity of the battery support structure 10 and so on.

With reference to FIG. 7A, a discharge unit 22 is a unit that discharges air that has cooled the lower battery module body 20. The discharge unit 22 is disposed inside the battery pack case 17 and faces toward the outside in the vehicle width direction, which is a left end side herein. In addition, the discharge unit 22 being a chamber faces the vehicle outside, which is a left side. The lower battery module body 20 contains battery cells with cooling gaps between the battery cells for cooling the battery cells. This also applies to the upper battery module body 18.

Herein, a temperature sensor may be provided in a battery cell or an end plate that is disposed on the most outer side in the width direction in the upper battery module body 18 or the lower battery module body 20. In this state, the temperature sensor may detect a temperature rise of greater than a predetermined value. In such a case, the amount of heat that is received from the muffler pipe 36 and so on is determined to be great, and the airflow volume from a blower for cooling the upper battery module body 18 and the lower battery module body 20 is increased. Thus, it is possible to prevent a temperature rise of the upper battery module body 18 and the lower battery module body 20.

While the battery support structure 10 is operated, air is heated by the battery cells in the lower battery module body 20 and is discharged from the discharge unit 22 to the inside of the battery pack case 17. Then, the air flows up in the battery pack case 17 via spaces between side surfaces of the lower battery module body 20 and side surfaces of the battery pack case 17, before being released from the discharge duct 40 to the outside. At this time, the air that is discharged from the discharge unit 22 has a temperature lower than that of the muffler case 35 although it has exchanged heat with the battery cells.

FIG. 7B illustrates an area 44 where the air that is discharged from the discharge unit 22 flows through, by an alternate long and short dash line in an enclosed manner. The air that flows through the area 44 has a relatively low temperature and thus suitably cools the side surfaces of the lower battery pack case 172, whereby it is possible to prevent a temperature rise of the lower battery pack case 172 due to the muffler case 35 and the muffler pipe 36 in high temperature states. Moreover, before being released to the outside, the air that is discharged from the discharge unit 22 circulates to the discharge duct 40, which is disposed at the upper part of the battery pack case 17. Thus, stagnation of the air in the battery pack case 17 is reduced, resulting in preventing a local increase in temperature in the battery pack case 17.

In this embodiment, the support 16 is covered with the battery pack case 17 from the outside. In one example, a flange 173 is provided at a lower end of the upper battery pack case 171. The flange 173 includes a part extending toward a right side on the vehicle outside and also includes a part extending downward. A flange 174 is provided at an upper end of the lower battery pack case 172. The flange 174 extends toward a right side on the vehicle outside. A lower end of the flange 173 and an upper end of the flange 174 are coupled to each other on the outside of a first support member 32. In this structure, a space is provided between the battery pack case 17 and the support 16, that is, they are separated from each other, whereby heat conduction from the battery pack case 17 to the support 16 is reduced. Thus, it is possible to prevent a temperature rise of the upper battery module body 18 and the lower battery module body 20.

Figure 8:
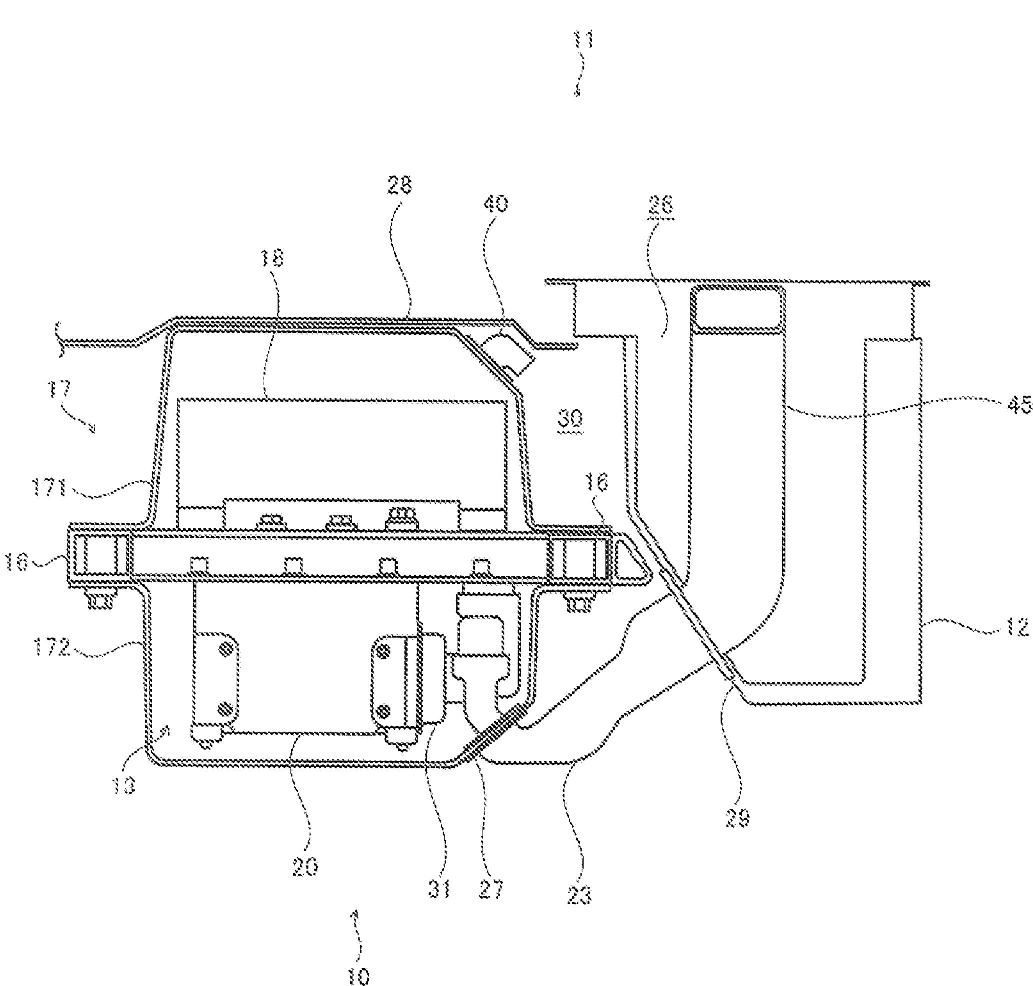
FIG. 8 is a sectional view illustrating a structure of the vehicle at and in the vicinity of the battery support structure and so on according to the embodiment of the disclosure.
Figure 8:
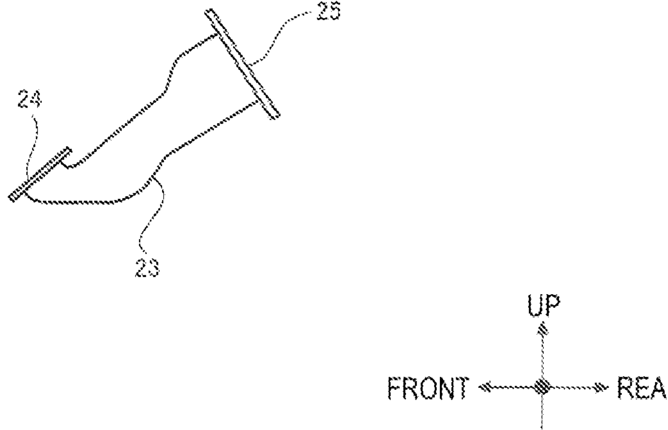

FIG. 8 is a sectional view illustrating a structure of the vehicle 11 at and in the vicinity of the battery support structure 10 and so on. In addition, the introduction duct 23 is separately illustrated on a lower side in FIG. 8.

Air is introduced from the sub-trunk 26 into the battery pack case 17 of the battery support structure 10. The sub-trunk 26 is a space communicating with the vehicle cabin of the vehicle 11 and is thus air-conditioned by an air conditioner equipped to the vehicle 11. In one example, the sub-trunk 26 is cooled in a high-temperature season, such as summer, and it is heated in a low-temperature season, such as winter. In these conditions, when the outside temperate is high, air is introduced into the battery pack case 17 of the battery support structure 10 from the sub-trunk 26 that is cooled, whereby the cooled low-temperature air effectively cools the lower battery module body 20 and the upper battery module body 18.

The space in the sub-trunk placement area 37 communicates with the lower battery module body 20 and the upper battery module body 18 contained in the battery pack case 17, via the vehicle interior duct 45, the introduction duct 23, and the inner duct 31. The vehicle interior duct 45 is disposed in the sub-trunk placement area 37. The introduction duct 23 couples the vehicle interior duct 45 and the inner duct 31 so as to make the sub-trunk placement area 37 and the battery pack case 17 communicate with each other. The introduction duct 23 is disposed under the floor 28, that is, on the outside of the vehicle cabin. The inner duct 31 makes the introduction duct 23 and each of the lower battery module body 20 and the upper battery module body 18 communicate with each other. In this structure, air that is cooled in the sub-trunk placement area 37 is sent to the upper battery module body 18 and the lower battery module body 20 via the vehicle interior duct 45, the introduction duct 23, and the inner duct 31. This effectively cools the battery cells contained in the upper battery module body 18 and in the lower battery module body 20.

The introduction duct 23 is disposed outside of the sub-trunk placement area 37 and the battery support structure 10. The introduction duct 23 includes a first end 24 that opens on a lower front side and also includes a second end 25 that opens on an upper rear side.

A rear end part of the lower surface of the lower battery pack case 172 is a first slope surface 27 that slopes upward toward the rear. A front side part of the floor 28 defining the sub-trunk placement area 37 is a second slope surface 29 that slopes upward toward the front.

The first end 24 of the introduction duct 23 is coupled to an opening formed in the first slope surface 27 of the lower battery pack case 172 and communicates with the inner duct 31. The second end 25 of the introduction duct 23 is coupled to an opening provided in the second slope surface 29 of the sub-trunk placement area 37 and communicates with the vehicle interior duct 45. This structure improves sealing characteristics at the first end 24 and the second end 25 of the introduction duct 23 and thereby prevents leakage of air from the joints to the outside. Moreover, coupling the first end 24 and the second end 25 of the introduction duct 23 respectively to the first slope surface 27 of the battery pack case 17 and the second slope surface 29 of the sub-trunk 26 reduces the amount of downward protrusion of the introduction duct 23. For example, the lowest part of the introduction duct 23 can be disposed above the bottom surface of the lower battery pack case 172. As a result, at the time the vehicle 11 rides over a curbstone or the like during traveling, the introduction duct 23 is prevented from coming into contact with the curbstone or the like. In addition, it is possible to easily couple the introduction duct 23 in the manufacturing process.

A space 30 is a vehicle outside space that is provided in the vicinity of the battery pack case 17, and for example, that is provided on a rear side of the upper part of the rear surface of the battery pack case 17. The space 30 is a substantially closed space surrounded by the battery pack case 17, the floor 28, and so on. The air that is discharged from the battery pack case 17 is released to the space 30 via the discharge duct 40. In this structure, the discharge duct 40 is disposed in the space 30, which is a substantially closed space, whereby dust and water are prevented from entering the battery pack case 17 via the discharge duct 40. Moreover, due to the space 30 being a vehicle outside space, the air that is heated by cooling the upper battery module body 18 and the lower battery module body 20 does not return to the vehicle cabin of the vehicle 11. Thus, an unintentional temperature rise in the vehicle cabin is prevented.

Figure 9A:
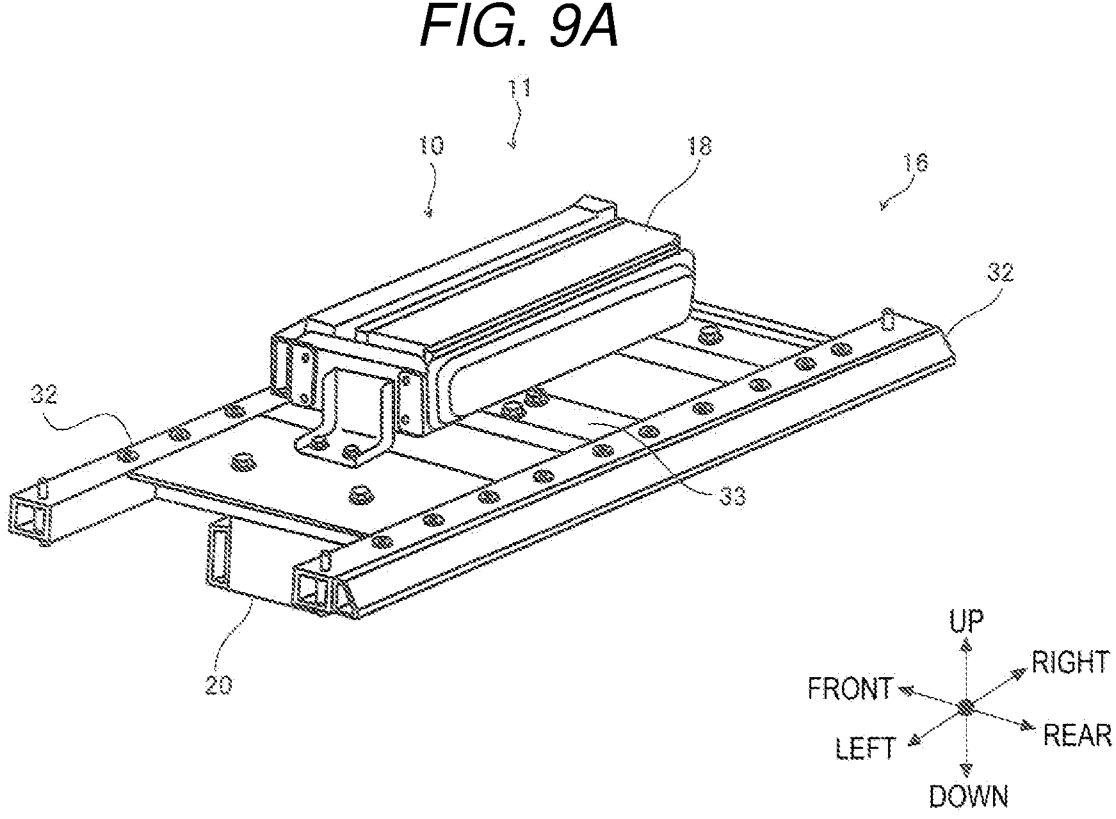
FIG. 9A is a perspective view illustrating the battery support structure according to the embodiment of the disclosure.

FIG. 9A is a perspective view illustrating the battery support structure 10 and the support 16.

The support 16 includes the first support member 32 and a second support member 33. The first support member 32 and the second support member 33 are formed of, for example, rectangular pillar-shaped metal members.

The first support member 32 extends in the right-left direction and is disposed at each of a front end and a rear end of the battery support structure 10. The right and left ends of the first support member 32 are joined to the vehicle body 12 (not illustrated herein).

The second support member 33 extends along the vehicle front-rear direction and is laid between the first support members 32. The rear end of the second support member 33 is joined to a front surface of the first support member 32 that is disposed on a rear side. The front end of the second support member 33 is joined to a rear surface of the first support member 32 that is disposed on a front side. In addition, a plurality of the second support members 33 are laid between the first support members 32 along the right-left direction. At least one of the second support members 33 is disposed at an approximate center of the first support member 32, which is a position corresponding to an approximate center of the vehicle 11. In these conditions, at the time a pillar-shaped object collides with the vicinity of the center in the vehicle width direction of the vehicle 11 from a rear side, the second support members 33, which are disposed at the center of the battery support structure 10, produce large reaction forces. Thus, it is possible to prevent the upper battery module body 18 and the lower battery module body 20 from being damaged due to collision.

Figure 9B:
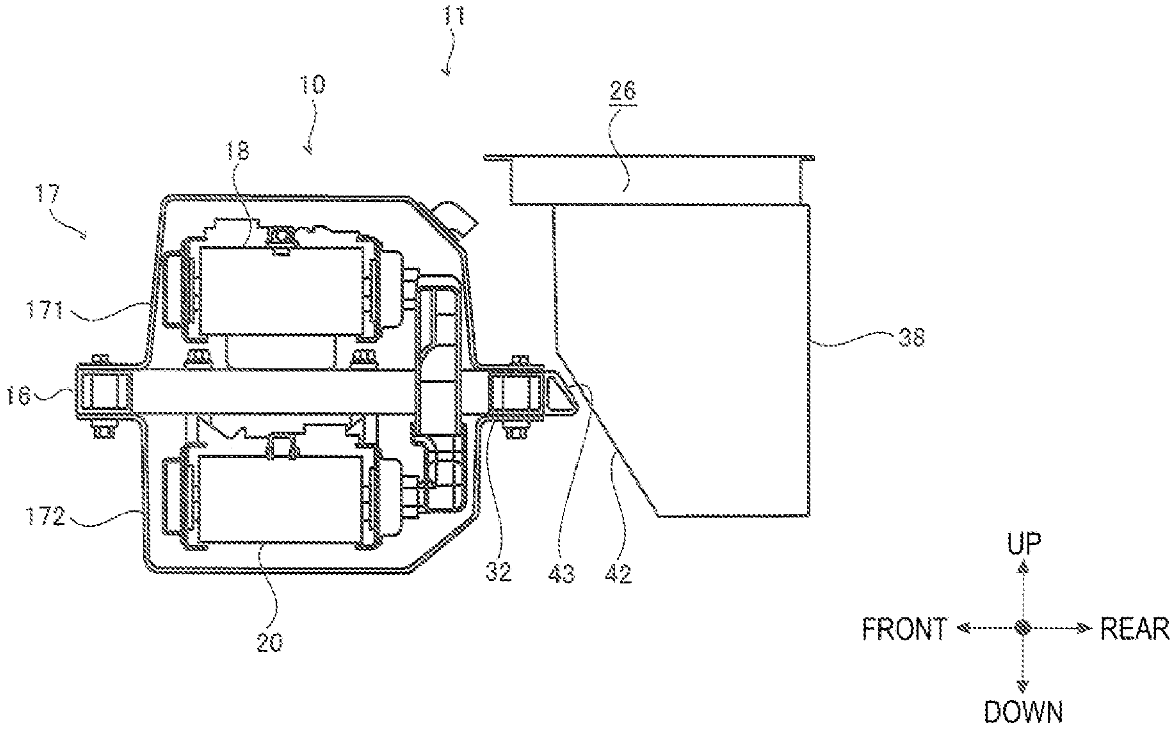
FIG. 9B is a sectional view illustrating a structure of the vehicle at and in the vicinity of the battery support structure and so on according to the embodiment of the disclosure.

FIG. 9B is a sectional view illustrating a structure of the vehicle 11 at and in the vicinity of the battery support structure 10 and so on.

The collision-resistant frame 38 is formed of a plate material having high rigidity, such as a metal plate, and it also serves as a partition plate for partitioning the inside of the sub-trunk 26. The lower part of a front side surface of the collision-resistant frame 38 is a slope surface 42 that slopes downward toward the rear. Meanwhile, a slope surface 43 is formed by making the rear surface of the first support member 32 slope downward toward the rear. The slope surfaces 42 and 43 face each other in the front-rear direction.

In this structure, at the time collision occurs at the rear part of the vehicle 11, the slope surface 42 of the collision-resistant frame 38 comes into contact with the slope surface 43 of the first support member 32 due to the impact. Thereafter, the collision-resistant frame 38 is guided by the slope surface 42 of the collision-resistant frame 38 and moves upward toward the front. In accordance with this movement, the sub-trunk 26 and objects stored therein also move upward toward the front. Thus, at the time collision occurs, the sub-trunk 26 and objects stored therein are prevented from invading the battery support structure 10, whereby the upper battery module body 18 and the lower battery module body 20 contained in the battery support structure 10 are prevented from being damaged.

The above-described embodiments of the disclosure provide the following main effects.

With reference to FIG. 6, in the battery support structure 10, the air layer is provided between each of the upper battery module 14 and the lower battery module 15 and the battery pack case 17, and the air layer functions as a thermal insulation layer. Thus, heat conduction from the outside to the upper battery module 14 and the lower battery module 15 is reduced. The upper battery module body 18 is coupled to the support 16 via the upper battery module fixing member 19, whereas the lower battery module body 20 is coupled to the support 16 via the lower battery module fixing member 21. Thus, each of the upper battery module body 18 and the lower battery module body 20 comes into substantially point contact with the support 16. This structure reduces heat conduction to the upper battery module body 18 and to the lower battery module body 20 via the support 16. In addition, the simple structure of the battery pack case 17 makes it possible to simplify the battery support structure 10 itself, and moreover, it facilitates providing a water-proof measure. As a result, this embodiment enables providing a battery support structure being excellent in characteristics such as thermal insulation.

With reference to FIGS. 7A and 7B, low-temperature air that has cooled the battery module 13 is sent between the battery module 13 and the battery pack case 17 and functions as a thermal insulation layer existing between the battery module 13 and the battery pack case 17. Thus, heat conduction from the muffler case 35, which is disposed in the vicinity of the battery support structure 10, to the battery module 13 is reduced, resulting in preventing a temperature rise of the battery module 13.

With reference to FIG. 8, the battery module 13 is effectively cooled by blowing air, which has been cooled in the vehicle cabin, to the battery module 13. Moreover, the introduction duct 23 for allowing cooling air to pass therethrough is coupled to the first slope surface 27 and the second slope surface 29. This structure reduces the amount of downward protrusion of the introduction duct 23 and prevents the introduction duct 23 from being damaged due to coming into contact with a travel surface while the vehicle 11 travels.

With further reference to FIG. 8, air that is heated by cooling the battery module 13 is not returned to the vehicle cabin, whereby an unintentional temperature rise in the vehicle cabin is prevented. Furthermore, air that has cooled the battery module 13 is discharged to the space 30, which is a substantially closed space surrounded by the floor 28 and so on, and therefore, powder dust, etc., are prevented from entering the battery pack case 17 via the discharge duct 40.

With reference to FIG. 9A, at the time collision occurs at the rear part of the vehicle 11, the second support members 33 resist the impact that is generated due to the collision, and thereby protects the battery module 13 from the impact.

Although the embodiments of the disclosure have been described above, the disclosure is not limited thereto, and various modifications and alterations can be made within the gist of the disclosure. The above-described embodiments can be combined with each other.

The invention claimed is:

1. A battery support structure configured to support a battery module to be provided in a vehicle, the battery support structure comprising:

an upper battery module and a lower battery module as the battery module;

a support; and a battery pack case, wherein the upper battery module comprises an upper battery module body within which is contained a plurality of upper positioned battery cells, and an upper battery module fixing member extending downward from the upper battery module body, the upper battery module fixing member being coupled to the support so as to fix the upper battery module to an upper surface of the support and so as to suspend the upper battery module body above the upper surface of the support such that an upper fluid flow clearance space is provided between a lower surface of the upper battery module body and the upper surface of the support, the lower battery module comprises a lower battery module body within which is contained a plurality of lower positioned battery cells, and a lower battery module fixing member extending upward from the lower battery module body, the lower battery module fixing member being coupled to the support so as to fix the lower battery module to a lower surface of the support and so as to suspend the lower battery module body below the lower surface of the support such that a lower fluid flow clearance space is provided between an upper surface of the lower battery module body and the lower surface of the support and also between the upper surface of the lower battery module body and the lower surface of the upper battery module body, the battery pack case covers the upper battery module and the lower battery module, and the battery pack case is fixed to the support on an outside of the upper battery module and on an outside of the lower battery module, and wherein the battery pack case is configured as to avoid contact with the upper battery module body and the lower battery module body, wherein a first portion of the support is positioned as to be located radially inward of outer edging of the lower battery module body with the support being located vertically between each of the upper and lower module bodies, and wherein the support has upper and lower, radially internal, peripheral surface regions defining an opening in the support, and the upper and lower battery modules are respectively fixed by the upper and lower battery module fixing members such that the upper battery module body is suspended above the upper peripheral surface region while also extending over the opening in the support and so as to define the upper fluid flow clearance space, and the lower battery module body is suspended below the lower peripheral surface region while also extending below the opening in the support and so as to define the lower fluid flow clearance space, and wherein the opening in the support defines an air flow passage, and air flowing within the lower fluid flow clearance space passes through the air flow passage defined by the opening and into and within the upper fluid flow clearance space.

2. The battery support structure according to claim 1, further comprising:

a discharge unit configured to discharge air having cooled the battery module, wherein the discharge unit is disposed inside the battery pack case and on an outer side in a width direction of the vehicle.

3. The battery support structure according to claim 1, further comprising:

an introduction duct comprising a first end and a second end, the introduction duct being a path configured to introduce air into the battery pack case, the air having been conditioned in a vehicle cabin of the vehicle, and a sub-trunk placement area disposed on a rear part of the battery module, wherein a rear end part of a lower surface of the battery pack case is a first slope surface that slopes upward toward rearward of the vehicle, a front side part of a floor defining the sub-trunk placement area is a second slope surface that slopes upward toward frontward of the vehicle, the first end of the introduction duct is coupled to the first slope surface, and the second end of the introduction duct is coupled to the second slope surface.

4. The battery support structure according to claim 1, wherein the support comprises first support members extending along the vehicle width direction, and a second support member laid between the first support members, the second support member extending along a front-rear direction of the vehicle.

5. The battery support structure according to claim 1, wherein the battery pack case is configured such that there is clearance between an upper surface of the upper battery module body and an overlying portion of the case, and a clearance is further formed between a lower surface of the lower battery module body and an underlying portion of the case, and wherein the upper battery module fixing member is secured to a peripheral external side of the upper battery module body, and the lower battery module fixing member is secured to a peripheral external side of the lower battery module body.

6. The battery support structure according to claim 1 wherein the support includes a portion that is positioned as to be located radially inward of each of the upper and lower battery module bodies and also vertically between each of the upper and lower bodies.

7. The battery support structure according to claim 1, wherein the lower battery module has a greater number of battery module bodies positioned below the support than the number of upper battery module bodies of the upper battery module positioned above the support.

8. The battery support structure according to claim 1, wherein the upper battery module fixing member is coupled to a lower end part of a side wall of the upper battery module body.

9. The battery support structure according to claim 1, wherein the battery support structure is configured such that an entirety of the battery case is situatable below the floor of the vehicle and between muffler cases of the vehicle.

10. The battery support structure according to claim 1, wherein the battery support structure further comprises a forced air flow introduction port which is supported by the battery pack case and feeds air flow into the battery pack case for passage of the air flow into contact with the upper and lower battery modules, which are thermally insulated from each other based on the configuration of the upper and lower battery module fixing members, and wherein the battery support structure further comprises a discharge port that is also supported by the battery pack case and through which the introduced air flow is discharged away from the battery pack case.

11. The battery support structure according to claim 2, further comprising:

an introduction duct comprising a first end and a second end, the introduction duct being a path configured to introduce air into the battery pack case, the air having been conditioned in a vehicle cabin of the vehicle, and a sub-trunk placement area disposed on a rear part of the battery module, wherein a rear end part of a lower surface of the battery pack case is a first slope surface that slopes upward toward rearward of the vehicle, a front side part of a floor defining the sub-trunk placement area is a second slope surface that slopes upward toward frontward of the vehicle, the first end of the introduction duct is coupled to the first slope surface, and the second end of the introduction duct is coupled to the second slope surface.

12. The battery support structure according to claim 2, wherein the support comprises first support members extending along the vehicle width direction, and a second support member laid between the first support members, the second support member extending along a front-rear direction of the vehicle.

13. The battery support structure according to claim 3, wherein a space is provided in a vicinity of the battery pack case, the space being surrounded by the battery pack case and the floor, and the battery pack case is configured to discharge air to the space.

14. The battery support structure according to claim 3, wherein the support comprises first support members extending along the vehicle width direction, and a second support member laid between the first support members, the second support member extending along a front-rear direction of the vehicle.

15. The battery support structure according to claim 11, wherein a space is provided in a vicinity of the battery pack case, the space being surrounded by the battery pack case and the floor, and the battery pack case is configured to discharge air to the space.

16. The battery support structure according to claim 11, wherein the support comprises first support members extending along the vehicle width direction, and a second support member laid between the first support members, the second support member extending along a front-rear direction of the vehicle.

17. The battery support structure according to claim 13, wherein the support comprises first support members extending along the vehicle width direction, and a second support member laid between the first support members, the second support member extending along a front-rear direction of the vehicle.

18. The battery support structure according to claim 15, wherein the support comprises first support members extending along the vehicle width direction, and a second support member laid between the first support members, the second support member extending along a front-rear direction of the vehicle.

19. A battery support structure configured to support a battery module to be provided in a vehicle, the battery support structure comprising:

an upper battery module and a lower battery module as the battery module;

a support; and a battery pack case, wherein the upper battery module comprises an upper battery module body within which is contained a plurality of upper positioned battery cells, and an upper battery module fixing member extending downward from the upper battery module body, the upper battery module fixing member being coupled to the support, the lower battery module comprises a lower battery module body within which is contained a plurality of lower positioned battery cells, and a lower battery module fixing member extending upward from the lower battery module body, the lower battery module fixing member being coupled to the support, the battery pack case covers the upper battery module and the lower battery module, and the battery pack case is fixed to the support on an outside of the upper battery module and on an outside of the lower battery module, and wherein a first portion of the support is positioned as to be located radially inward of outer edging of the lower battery module body with the support being located vertically between each of the upper and lower module bodies, and wherein the battery pack case does not come into contact with the upper battery module body and the lower battery module body, and wherein the support has upper and lower, radially internal, peripheral surface regions defining an opening in the support, and the upper and lower battery modules are respectively fixed by the upper and lower battery module fixing members such that the upper battery module body is suspended above the upper peripheral surface region while also extending over the opening in the support and so as to define an upper fluid flow clearance space, and the lower battery module body is suspended below the lower peripheral surface region while also extending below the opening in the support and so as to define a lower fluid flow clearance space, and wherein the opening in the support defines an air flow passage, and air flowing within the lower fluid flow clearance space passes through the air flow passage defined by the opening and into and within the upper fluid flow clearance space.

20. The battery support structure according to claim 19 wherein the support further includes a second portion that is positioned as to be located radially inward of each of the upper and lower battery module bodies and also vertically between each of the upper and lower bodies.

* * * * *